United States Patent
Gehin

(10) Patent No.: US 9,878,855 B2
(45) Date of Patent: Jan. 30, 2018

(54) DEVICE AND METHOD FOR FEEDING FOR ACCUMULATION

(71) Applicant: Gebo Packaging Solutions France SAS, Reichstett (FR)

(72) Inventor: Anthony Gehin, Reichstett (FR)

(73) Assignee: GEBO PACKAGING SOLUTIONS FRANCE SAS, Reichstett (FR)

( * ) Notice: Subject to any disclaimer, the term of this patent is extended or adjusted under 35 U.S.C. 154(b) by 0 days.

(21) Appl. No.: 15/196,464

(22) Filed: Jun. 29, 2016

(65) Prior Publication Data

US 2017/0001810 A1 Jan. 5, 2017

(30) Foreign Application Priority Data

Jun. 30, 2015 (FR) ..................... 15 56106

(51) Int. Cl.
*B65G 47/08* (2006.01)
*B65G 37/00* (2006.01)
(Continued)

(52) U.S. Cl.
CPC ......... *B65G 47/5131* (2013.01); *B65G 37/00* (2013.01); *B65G 47/5113* (2013.01); *B65G 47/69* (2013.01)

(58) Field of Classification Search
CPC .... B65G 37/00; B65G 47/69; B65G 47/5113; B65G 47/5131; B65G 47/5118; B65G 47/5127
(Continued)

(56) References Cited

U.S. PATENT DOCUMENTS 3,340,992 A 9/1967 Seragnoli
3,608,698 A * 9/1971 Crall ................. B65G 47/5145
198/358

(Continued)

FOREIGN PATENT DOCUMENTS

EP 0 826 614 A2 3/1998
EP 1 144 285 B1 7/2002
(Continued)

OTHER PUBLICATIONS

French Search Report, dated May 9, 2016, from corresponding French Application.

*Primary Examiner* — Mark A Deuble
(74) *Attorney, Agent, or Firm* — Young & Thompson

(57) ABSTRACT

A method and device for feeding at least one receiving surface between two consecutive stations in a production line for handling products on an assembly line, the device having a pick-up zone from where the products are transferred to the surface, and including an input conveyor to receive and maintain a compact flow of products received from an upstream station, a receiving conveyor, extending along a conveying direction in the pick-up zone to receive and then stop the flow of products there delivered by the input conveyor, an a transfer unit, to move, transversely to the conveying direction, toward the receiving surface, the products stopped in the pick-up zone. The device further includes at least one buffer conveying element, able to receive the compact flow of products from the input conveyor when the products are stopped on the receiving conveyor for their transfer, and maintain the compactness of the flow.

20 Claims, 12 Drawing Sheets

(51) Int. Cl.
*B65G 47/51* (2006.01)
*B65G 47/69* (2006.01)

(58) Field of Classification Search
USPC .......................................... 198/426, 429, 430
See application file for complete search history.

(56) References Cited

U.S. PATENT DOCUMENTS

| | | | |
|---|---|---|---|
| 4,499,987 A | 2/1985 | Long | |
| 4,768,642 A * | 9/1988 | Hunter | B65G 47/082 |
| | | | 198/419.2 |
| 4,932,190 A * | 6/1990 | Bergner | B65B 35/44 |
| | | | 198/418.5 |
| 5,127,209 A * | 7/1992 | Hunter | B65B 35/44 |
| | | | 198/419.3 |
| 6,019,213 A * | 2/2000 | Schubert | B65G 17/26 |
| | | | 198/419.3 |
| 6,202,827 B1 * | 3/2001 | Drewitz | B65G 47/082 |
| | | | 198/433 |
| 6,296,103 B1 * | 10/2001 | Gross | B26D 7/0675 |
| | | | 198/429 |
| 8,863,937 B2 * | 10/2014 | Buchenberg | B65G 43/08 |
| | | | 198/341.02 |
| 2003/0167101 A1 | 9/2003 | Philipp | |
| 2010/0193330 A1 | 8/2010 | Petrovic et al. | |
| 2011/0220460 A1 * | 9/2011 | Seger | B65G 47/71 |
| | | | 198/437 |
| 2012/0132503 A1 | 5/2012 | Petrovic | |
| 2015/0021143 A1 | 1/2015 | Seger et al. | |
| 2015/0239591 A1 * | 8/2015 | Bialy | B65G 37/00 |
| | | | 53/517 |
| 2015/0291367 A1 | 10/2015 | Petrovic | |

FOREIGN PATENT DOCUMENTS

| | | |
|---|---|---|
| EP | 1 331 181 A1 | 7/2003 |
| EP | 1 792 857 A1 | 6/2007 |
| EP | 2 188 199 B1 | 12/2012 |
| EP | 2 459 472 B1 | 7/2013 |
| EP | 2 826 735 A1 | 1/2015 |
| WO | 2008/026478 A1 | 3/2008 |
| WO | 2014/076390 A1 | 5/2014 |

* cited by examiner

DEVICE AND METHOD FOR FEEDING FOR ACCUMULATION

FIELD OF THE INVENTION

This invention relates to the field of conveying products within an industrial handling line, and has as its object, on the one hand, a feeding device for a receiving surface as well as a preparation device using it, and, on the other hand, a method using this feeding device, namely a feeding method for a receiving surface.

BACKGROUND OF THE INVENTION

In this field, the products, which can be bottles, cans, vials, boxes, cases, cartons, bundles, or the like, are conveyed between successive handling stations using conveyors essentially of the endless-belt type. The products are handled or even conveyed in a single line, in multiple lines, and thus conveyed even also in bulk.

To have a complete line able to produce continuously despite stoppages of the different stations, for different reasons such as faults or missing consumables, it is necessary to have accumulation solutions between the stations, which receive the products handled by the upstream station while the downstream station cannot operate, and/or which furnish the downstream station with products to be handled when the upstream station cannot operate. The preparation of the products for the downstream station is also necessary, for example, while positioning the flow in multiple lines, etc.

EP1144285 discloses, for example, an accumulation table where the products arrive in multiple lines and come out again in multiple lines at the opposite end. EP2459472 describes in turn an accumulation table where the products leave and enter on the same side, each time, there again, in multiple lines. One of the drawbacks of such solutions is that, to mount it between two stations at least one of the two of which operates in a single line, it is necessary to accommodate a change in the flow, from the single line to the multiple lines, and/or from the multiple lines to the single line, as described in, for example, EP2188199. Such an architecture nevertheless has overall a very considerable footprint, and creates potential problems of jamming during the changes from multiple-line flow to single-line flow. Actually, a flow in bulk is organized quite often with a staggering of the products that it is difficult to eliminate.

Finally, an accumulation solution with a single-line input, a transverse accumulation on a horizontal surface, and then a single-line output is known from WO2014076390. The feeding of such an accumulation surface relies nevertheless on the sequence, downstream from the feeding by the upstream station, of a conveyor at overspeed, and then of a conveyor operating in on/off mode. This latter conveyor makes it possible to put the products in shutdown for their transverse offsetting to the accumulation surface. Upstream, the products on the conveyor at overspeed are spaced apart and then compressed again on the approach to the on/off conveyor. This separation that it causes between the products thus makes it possible to allow the products to accumulate at the terminating end of the conveyor at overspeed, when the downstream conveyor is stopped. At a high rate, this principle of transition between a continuous flow, upstream, and an interrupted flow, downstream, is problematic because it produces accelerations, impacts and decelerations for the products that may be fragile, such as, typically, empty glass bottles.

A need therefore exists in the current state of the art for an accumulation solution that is of large capacity, of reduced bulk, and/or that limits the risks to the products when they are input.

SUMMARY OF THE INVENTION

To do this, the invention proposes essentially feeding laterally an accumulation-surface-type receiving surface, the products to be transferred being stopped, and the products delivered during this time from the upstream station being, while waiting for their own transfer, received without separating them more and therefore not exceeding their input speed.

The invention thus has as its object a device for feeding at least one receiving surface between two consecutive stations in a production line for handling products on an assembly line, having a pick-up zone from where the products are transferred to said surface, and comprising an input conveyor to receive and maintain a compact flow of products received from the upstream station, a receiving conveyor, extending along a direction of conveying in the pick-up zone to receive and then stop there the flow of products provided by the input conveyor, as well as a transfer means, to move, transversely to the conveying direction, toward the receiving surface, the products stopped in the pick-up zone.

This device is characterized in that
it comprises, further, at least one buffer conveying means, able to, on the one hand, receive the compact flow of products from the input conveyor when the products are stopped on the receiving conveyor for their transfer, and, on the other hand, maintain the compactness of said flow.

The invention also has as its object a preparation device to be mounted between two stations in a production line for handling products on an assembly line, comprising at least one rectangular-shaped receiving surface on which products can be accumulated, characterized in that it further comprises a feeding device as described above, positioned so that the receiving conveyor extends along an edge of said at least one receiving surface.

Finally, the invention has as its object a method used by this device, namely a method for feeding a receiving surface installed between two stations in a production line for handling products on an assembly line, comprising receiving continuously a compact flow of products from the upstream station in the area of an input conveyor, in particular a flow where the products are in contact one behind the other in a single line, feeding, using said input conveyor, a receiving conveyor on which the flow maintains its compactness, braking until stopping the products on the receiving conveyor, preferably by gradually stopping the receiving conveyor, then freeing up the receiving conveyor while removing from it the products that are found there to, on the one hand, accumulate them later on a receiving surface, and, on the other hand, to make it possible for the receiving conveyor to receive new products.

This method is characterized in that it comprises a step, used during the braking and the freeing-up of the products of the receiving conveyor, consisting essentially in feeding the compact flow of products of the input conveyor to a buffer conveying means by maintaining the compactness of it, so as to receive the flow continuously from the upstream station without modifying it and thus not creating any risk of impact between the products or from uncontrolled acceleration and/or deceleration, as well as a subsequent step during which the products that are found on the buffer conveying means are cleared from it, to, on the one hand, accumulate them later on the or a receiving surface, and, on the other hand, to make it possible for the buffer conveying means to receive new products.

BRIEF DESCRIPTION OF THE DRAWINGS

The invention will be better understood as a result of the description below, which is based on possible embodiments, explained in a way that is illustrative and in no way limiting, with reference to the accompanying figures, in which.

DETAILED DESCRIPTION OF THE INVENTION

Figure 1:
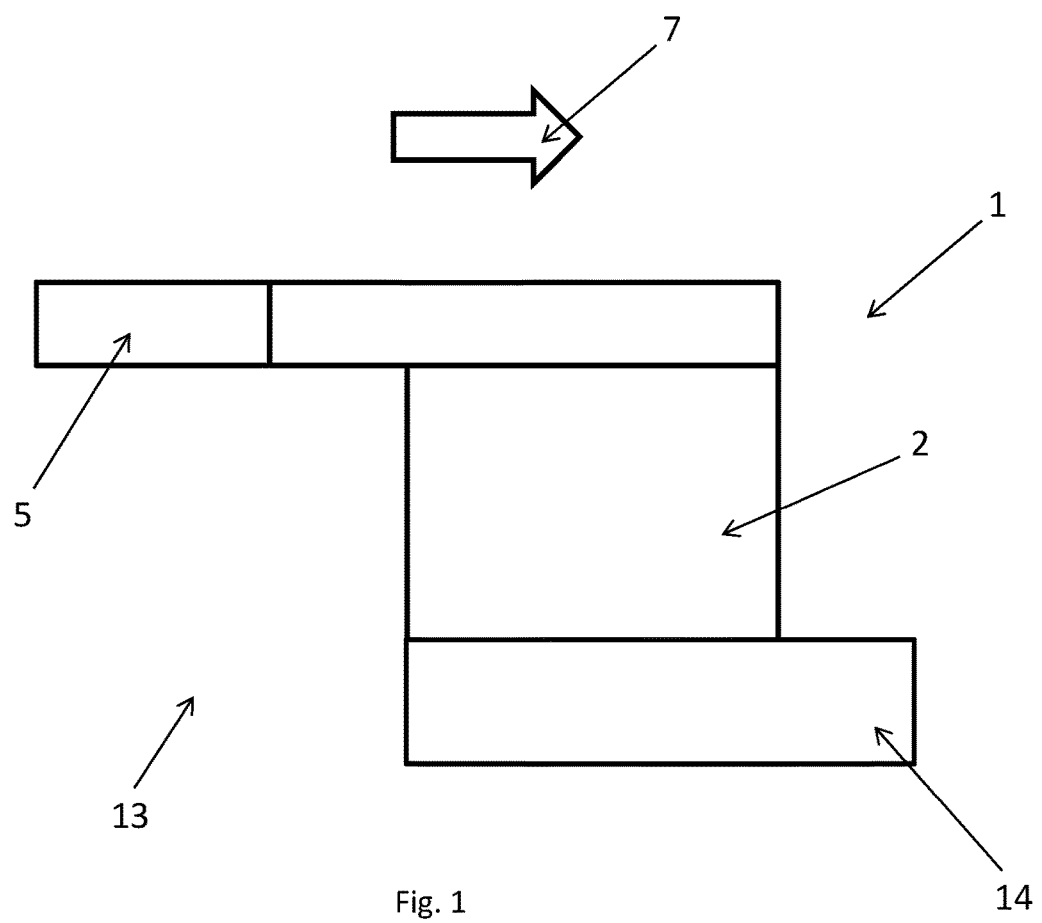
FIG. 1 shows an accumulation architecture seen from above.

The invention therefore has first of all as its object a feeding device 1 for at least one receiving surface between two consecutive stations in a production line for handling products 3 on an assembly line, having a pick-up zone 4 where the products 3 are transferred to said surface, and comprising an input conveyor 5 to receive and maintain a compact flow of products 3 received from the upstream station, a receiving conveyor 6, extending along a conveying direction 7 in a pick-up zone 4 to receive and then stop there the flow of products 3 furnished by the input conveyor 5, as well as a transfer means 8, to move, transversely to the conveying direction 7, toward the receiving surface, the products 3 stopped in the pick-up zone 4.

The receiving surface is therefore installed between two consecutive stations in an industrial installation. The products 3, of the bottles, vials, cases, and cartons type, are conveyed between these stations by conveyor belts on which they rest. The products 3 can all be oriented in the same way or not. The feeding device 1 therefore receives the products 3 from the upstream station and delivers them to the receiving surface. The receiving conveyor 6 can extend in the conveying direction 7 also upstream from the pick-up zone 4.

The receiving surface can take, for example, the form of an accumulation surface 2 that makes it possible to manage the differences between the flows of two consecutive stations between which it is positioned and which then has a suitable accumulation capacity, or else the form of a preparation surface where the products 3 are received to be organized in pathways, even to reproduce a pallet layout.

The products 3 are received from the upstream station thanks to an input conveyor 5 that maintains the flow of products 3 coming from the upstream station. During their presence on the input conveyor 5, the products 3 therefore travel while keeping their spacing given by the upstream station, which guarantees an exact continuity of the operation.

The receiving surface has a rectangular shape, the products 3 being fed onto it from one of its sides, and being output from the other side. The receiving surface therefore receives segments of the continuous flow dispensed by the upstream station. These longitudinal segments are stored beside one another on the receiving surface, which makes it possible to avoid an interlocking between the products 3, difficult to undo later. The feeding of the receiving surface is therefore done by the receiving conveyor 6, mounted downstream from the input conveyor 5, and which extends along the receiving surface, in the area of the edge from where the products 3 are fed onto said surface. The products 3 can arrive in a single line on the receiving conveyor 6 or in multiple lines.

The transfer of the products 3 onto the receiving surface is done thanks to a transfer means 8 that moves the products 3 by longitudinal batch, in a direction of movement that is transverse to the conveying direction 7. For this transfer, the products 3 are brought into a pick-up zone 4, from which the transfer means 8 takes them. The receiving conveyor 6 therefore brings the products 3 into this pick-up zone. The products 3 are preferably stopped for their transfer onto the receiving surface. The input conveyor 5 therefore has an operation that is preferably synchronized with the upstream station, whereas the receiving conveyor 6 has a variable speed between, on the one hand, a zero speed to stop the products 3 to clear them from the pick-up zone 4, and, on the other hand, the same speed as the input conveyor 5, to receive the products 3 from it without changing the flow.

According to the invention, the feeding device 1 further comprises at least one buffer conveying means, able to, on the one hand, receive the compact flow of products 3 from the input conveyor 5 when the products 3 are stopped on the receiving conveyor 6 for their transfer, and, on the other hand, to maintain the compactness of said flow, the compact flow being in particular single-line with products 3 in contact with one another or slightly spaced. The products 3 on the buffer conveying means can then be sent to the same receiving surface, toward another receiving surface, toward a buffer or wait zone 11 of the dead-plate type, or even directly toward the pick-up zone 4, etc.

Thus, both the input conveyor 5 and the buffer conveying means maintain the compactness of the flow of the product 3. The products 3 do not then undergo any impact and the flow from the upstream station is not altered.

The buffer conveying means, which forms an additional axis of conveying, can, for example, take the form of an additional buffer conveyor 9, which rotates continuously or in a complementary fashion to the receiving conveyor 6, even the form of additional conveying links, as will be described.

When the products 3 are stopped on the receiving conveyor 6, the flow coming from the upstream station is absorbed thanks to the activation of the buffer conveying means, so that neither the operation of the upstream station nor the flow of product are disturbed.

As will be described later, a diverter 12 can be provided to direct the flow of products 3 from the input conveyor 5 either to the receiving conveyor 6 or to the buffer conveying means. The flow can be slightly expanded and then recompacted at the time of this diverting. On the whole, the flow nevertheless maintains the same compactness in that the products 3 are not temporarily crammed against one another because of a retractable front stop, for example, or even separated quickly by a conveyor at overspeed used to create batches intermittently from a continuous flow.

According to a possible additional characteristic, the feeding device 1 further comprises a clearing tool 10 to clear the products 3 from the at least one buffer conveying means with the objective of a future reception of products 3, the transfer means 8 being able in particular to form said clearing tool 10. The products 3 can then be received, alternatively, either onto the receiving conveyor 6, or onto the buffer conveying means. The products 3 are then optionally indiscriminately brought to the same receiving surface. It is therefore understood that two different means can be used alternatively for these two clearing functions.

The clearing tool 10 can then bring the products 3 onto the receiving surface or elsewhere.

In certain embodiments, the clearing tool 10 moves the products 3 from the at least one stopped buffer conveying means directly onto a receiving surface other than the one onto which the transfer means 8 brings the products 3 from the receiving conveyor 6. The feeding device 1 is thus provided with two receiving surfaces, fed alternately, the one part the receiving conveyor 6, and the other part the buffer conveying means. It is understood that the receiving conveyor and the buffer conveying means have essentially the same operation but in an alternating manner; the products being received on the one while, on the other, they are stopped for a transfer.

In other possible embodiments, the clearing tool 10 moves the products 3 from the at least one stopped buffer conveying means directly onto the same receiving surface as the one onto which the transfer means 8 brings the products 3 from the receiving conveyor 6. The products 3 are therefore accumulated beside one another on the receiving surface, alternately from the receiving conveyor 6 or the buffer conveying means. The same tool can also be used to move the products 3 to the receiving surface, both from the receiving conveyor 6 and from the buffer conveying means.

In certain embodiments, the clearing tool 10 moves the products 3 from the at least one stopped buffer conveying means directly onto a wait zone 11, from where the transfer means 8 then grasps them to move them directly onto the receiving surface, at the same time as the products 3 from the receiving conveyor 6. The feeding operation of the receiving surface with products 3 coming from the buffer conveying means is therefore done in two operations, while the feeding of the receiving surface with products 3 coming from the receiving conveyor 6 is done in a single operation. The products 3 from the buffer conveying means are sent onto a wait zone 11, dead-plate type, between said buffer conveying means and the receiving conveyor 6, the latter being found between the wait zone 11 and the receiving surface. Thus, once the receiving conveyor 6 is stopped, the transfer means 8 clears onto the accumulation surface simultaneously the products 3 from the wait zone 11 and the products 3 on the receiving conveyor 6, while the input conveyor 5 delivers its products 3 to the buffer conveying means.

Two different tools are therefore used: one to move the products 3 from the buffer conveying means onto the wait zone 11, and one to move the products 3 from the wait zone 11 and from the receiving conveyor 6 onto the receiving surface.

In certain embodiments, the clearing tool 10 moves the products 3 from the at least one buffer conveying means to the receiving conveyor 6, for a subsequent transfer to the receiving surface, the buffer conveying means being in particular constantly in motion. The latter can then have an operation that is synchronized with the input conveyor 5, while the receiving conveyor 6 has an alternate operation. The clearing tool 10 here can be a simple diverter, in the simple case where the buffer conveying means and the receiving conveyor 6 are two conveyor belts side by side. The products 3 from the upstream conveying means are brought into the downstream part of the receiving conveyor 6 thanks to this clearing tool 10, while the input conveyor continues to feed products onto the upstream part of the receiving conveyor 6. Once stopped, the batch of products 3 transferred by the transfer means 8 contains products 3 that have traveled by the buffer conveying means and products 3 that have not traveled by said means.

According to a possible additional characteristic, the feeding device 1 comprises a diverter 12 to direct the compact flow of products 3 from the input conveyor 5 either to the receiving conveyor 6 or to the at least one buffer conveying means. As has already been said, the spacing between the products 3 can slightly vary during this diverting, without this being able to be considered as a substantial modification of the compactness of the flow or an expansion of the flow. The receiving conveyor 6 and the buffer conveying means are therefore used alternately, each one receiving the products 3 when the other changes its speed to clear the products 3 that it previously received.

According to another possible additional characteristic, the buffer conveying means and the receiving conveyor 6 are in sequence, the buffer conveying means coming between the input conveyor 5 and the receiving conveyor 6. Thus, during the stop phase of the receiving conveyor 6, the products 3 are accommodated on the buffer conveying means, which can then have a useful size that depends on the flow to be absorbed. Possible technical embodiments are developed later.

The invention also has as its object a preparation device to be mounted between two stations in a production line for handling products 3 on an assembly line, comprising at least one rectangular-shaped receiving surface on which products 3 can be accumulated, preferably in groups of longitudinal batches, each aligned in the conveying direction 7. This preparation can consist in, for example, receiving and geometrically organizing a pre-defined number of products 3, or even simply putting the products 3 on standby on a receiving surface that forms an accumulation surface 2 to ensure a buffer function between two stations. The preparation device then forms an accumulation device 13 ensuring a buffer between two consecutive stations of an industrial handling line, between which it is mounted.

According to the invention, it further comprises a feeding device 1 as described, positioned so that the receiving conveyor 6 extends along an edge of said at least one receiving surface.

In possible embodiments, the preparation device further comprises, on the one hand, at least one output conveyor 14, extending along the edge of the at least one receiving surface that is opposite the one where the receiving conveyor 6 extends, and, on the other hand, an output tool 15 to move the products 3 from the receiving surface to said output conveyor 14. Each optional receiving surface is provided with its output conveyor 14.

The output tool 15 can be a gripping tool that moves the products 3 from the receiving surface onto the output conveyor 14, opposite the input side, for example by a cap that comes from the top. It can also take the form of a pusher, and even simply of a conveyor belt from which the preparation surface is provided and at the end of which the radius of curvature has the effect of depositing the products 3 onto said output conveyor 14.

The invention also has as its object a method using the feeding device as described above, namely a method of feeding a receiving surface installed between two stations in a production line for handling products 3 on an assembly line, comprising receiving continuously a compact flow of products 3 from the upstream station in the area of an input conveyor 5, in particular a flow where the products 3 are in contact one behind the other in a single line, feeding, using said input conveyor 5, a receiving conveyor 6 on which the flow maintains its compactness, braking until stopping the products 3 on the receiving conveyor 6, preferably while gradually stopping the receiving conveyor 6, then freeing up the receiving conveyor 6 while removing the products 3 from it that are found there to, on the one hand, accumulate them later on a receiving surface, and, on the other hand, make it possible for the receiving conveyor 6 to receive new products 3.

The flow of products 3 at input can be formed by products 3 in contact or spaced apart on the input conveyor 5, and it then arrives on a receiving conveyor 6. They are slowed down within the receiving conveyor 6 to a complete stop, by reducing the speed of the receiving conveyor 6 with a deceleration that avoids making the products 3 fall. The products 3 are slowed in the approach to the pick-up zone 4 and are found to have arrived stopped in the area of said zone.

According to the invention, the method comprises a step, used during the braking and the freeing-up of the products 3 of the receiving conveyor 6, consisting essentially in feeding the compact flow of products 3 from the input conveyor 5 to a buffer conveying means while maintaining the compactness of it, so as to receive continuously the flow from the upstream station without changing it and thus not creating any risk of impact between the products 3 or of uncontrolled acceleration and/or deceleration, as well as a subsequent step during which the products 3 that are found on the buffer conveying means are cleared from it, to, on the one hand, accumulate them later on the or a receiving surface, and, on the other hand, make it possible for the buffer conveying means to receive new products 3. The flow of products 3 is therefore received on the buffer conveying means when those on the receiving conveyor 6 are stopped. Conversely, in possible embodiments, the products 3 are received on the receiving conveyor 6 when those previously received on the buffer conveying means are cleared from it.

According to a possible additional characteristic, the method comprises a step consisting essentially in changing the direction of the compact flow from the input conveyor 5 to the receiving conveyor 6 or to the or a buffer conveying means. The travel of the products 3 is therefore slightly modified as a function of the downstream portion to where they must be brought. The products 3 are brought, as a function of the state of the associated diverter, either to the receiving conveyor 6, or to the at least one buffer conveying means.

According to another possible additional characteristic, the method comprises, during the feeding of the receiving conveyor 6 using the input conveyor 5, braking until stoppage of the products 3 on the buffer conveying means, preferably by gradually stopping the buffer conveying means, and freeing up the buffer conveying means by clearing the products 3 from it by transferring them to a wait zone 11 of the dead-plate type, and, during the subsequent feeding of the buffer conveying means, transferring simultaneously to the receiving surface both the products 3 in a wait zone 11 and the products 3 stopped on the receiving conveyor 6 between the two.

This transfer can be done by a movement of the sweeping type or else by grasping the products 3 using a gripping cap that grabs them by the top, and then brings them to the side. A cycle for receiving products 3, for braking until stoppage, for evacuation, is therefore repeated both for the receiving conveyor 6 and for the buffer conveying means, the receiving on the one being done during the slowing-down of the other. The geometric configuration according to which these two means are embodied by the conveyor belts side by side, along the receiving surface, then makes it possible to provide a receiving zone between them, and then to clear to the receiving surface simultaneously both the contents of this receiving zone and the contents of the belt between said zone and the receiving surface. The configuration is therefore relatively simple and the cycle times are effective.

In possible embodiments, the process comprises a step consisting essentially in increasing the length of conveying between the input conveyor 5 and the receiving conveyor 6 so as to create between them a buffer conveying means that receives the flow while preserving the compactness of it. This is in particular compatible with the devices where the receiving conveyor 6 is downstream from the buffer conveying means. The capacity of the buffer conveying means is then variable and adjusted as a function of the cycle.

According to a possible additional characteristic, the compact flow of products 3 from the input conveyor 5 is accommodated continuously and cyclically by the sequence of numerous conveyors comprising a receiving conveyor 6 and at least one buffer conveying means, the braking and the stoppage of the products 3 for the purpose of their clearing for accumulation and freeing-up of a conveyor being accompanied by the accommodation of the compact flow by the next conveyor. The slowing-down of the products 3, by the receiving conveyor 6 or by the at least one buffer conveying means, however, concerns only the products 3 that are then cleared by the clearing tool 10 and/or the transfer means 8. In other words, the flow of the input conveyor 5 is absorbed by a second means, respectively the receiving means 6 or the at least one buffer conveying means, and then the products 3 present on the first means, respectively the at least one buffer conveying means or the receiving conveyor 6, are slowed until stopping. The diverting of the flow before the beginning of the slowing-down avoids the changing of the flow of products 3 on the input conveyor 5.

As in the examples described below, the receiving surface can be an accumulation surface 2 and the preparation device that uses it can be an accumulation device 13. FIG. 1 illustrates the standard arrangement of an installation according to the invention, with a rectangular-shaped accumulation surface 2, fed by the upstream station with products 3 in the area of one of its sides, and whose products 3 are removed toward the downstream station in the area of its opposite side. The products 3 are brought to the area of a feeding side and cleared in the area of an output side.

The products 3 can be containers of the type of bottles of liquid, vials, cans, or the like. They can be, for example, boxes, bundles or packs comprising several single-unit products 3, whose shape seen from above has one side longer than the other. The installation can be provided upstream from an orientation means making it possible to turn the products around the axis that is perpendicular to the conveying plane. The products 3 that are delivered by the input conveyor 5 can therefore have different orientations one after another.

The products 3 are brought onto the accumulation surface 2 thanks to a feeding device 1 that is placed essentially in the area of the feeding side. The products 3 arrive from the upstream station thanks to a conveyor of the endless-belt type, on which they rest vertically and which moves them in a conveying direction 7, which is parallel to the side where the products 3 arrive on the accumulation surface 2, and therefore also beside where they leave it. The feeding device 1 thus transfers the products 3 transversely in the conveying direction 7 in the form of batches each representing a segment of the flow of products 3 that arrive. This entering flow is preferably a single line. The batches of products 3 fed onto the accumulation surface 2 therefore correspond essentially to one side of said surface, and a maneuver essentially parallel to the conveying plane and transverse to the conveying direction 7 is enough therefore to bring the products 3 onto the conveying surface 2. The products 3 are therefore stored on the accumulation surface 2 without being positioned in a staggered arrangement, which avoids changes in single-line and multi-line flows and, conversely, which can produce jamming. The accumulation surface 2 can be provided with an endless-belt-type conveyor to bring the products 3 to the area of the output conveyor 14, in the area of the side of the surface from which they leave it.

The accumulation surface 2 therefore makes it possible to store successive rows of products 3, the products 3 being able in each case to have a different orientation, in the case already mentioned where a product 3 orienter is provided upstream. The accumulation surface 2 can thus be used, for example, to obtain a layer of products 3 to be palletized, since they are deposited there successively in rows that are against one another transversely to the conveying direction 7.

The output products 3 are cleared either in a single line or in multiple lines. Actually, it is entirely possible, in the case of a configuration where the upstream station delivers the products 3 in a single line and that the downstream station requires products 3 in multiple lines, to let the longitudinal batches of products 3 accumulate against one another in the area of the output side of the accumulation surface 2, and then to withdraw simultaneously several longitudinal batches, beside one another along a direction that is transverse to the conveying direction 7. The products 3 are cleared from the accumulation surface 2 there again transversely to the conveying direction 7 that they take downstream, which means that the batches of products 3 removed from the accumulation surface form successively longitudinal segments of the flow downstream from the accumulation surface 2.

This arrangement makes it possible to have a standard design that can be used for any accumulation capacity, but also a reduced ground surface.

The products 3 entering into the feeding device 1 come from an upstream station that dispenses them continuously and are thus organized in a compact flow, which means that they are generally in contact behind one another, conveyed by a conveyor band or belt whose advance is synchronized with the flow rate from said upstream station.

For the highest flow rates of products 3, achieving a movement that is solely transverse to the conveying direction 7 is challenging, since it is necessary to achieve, ultimately, a zero movement in the conveying direction 7, at least when the product 3 arrives on the accumulation surface. Transverse transfer devices that follow the movement of the products 3, until transversely shifting them then slowing them down, thus occupy a total length that is too great. In contrast, achieving a transverse transfer with a longitudinally fixed tool, from a longitudinally mobile flow of products 3, brings, at a high rate, impacts and disturbances of the upstream products 3 against the tool when it traverses their zone of passage.

Figure 2:
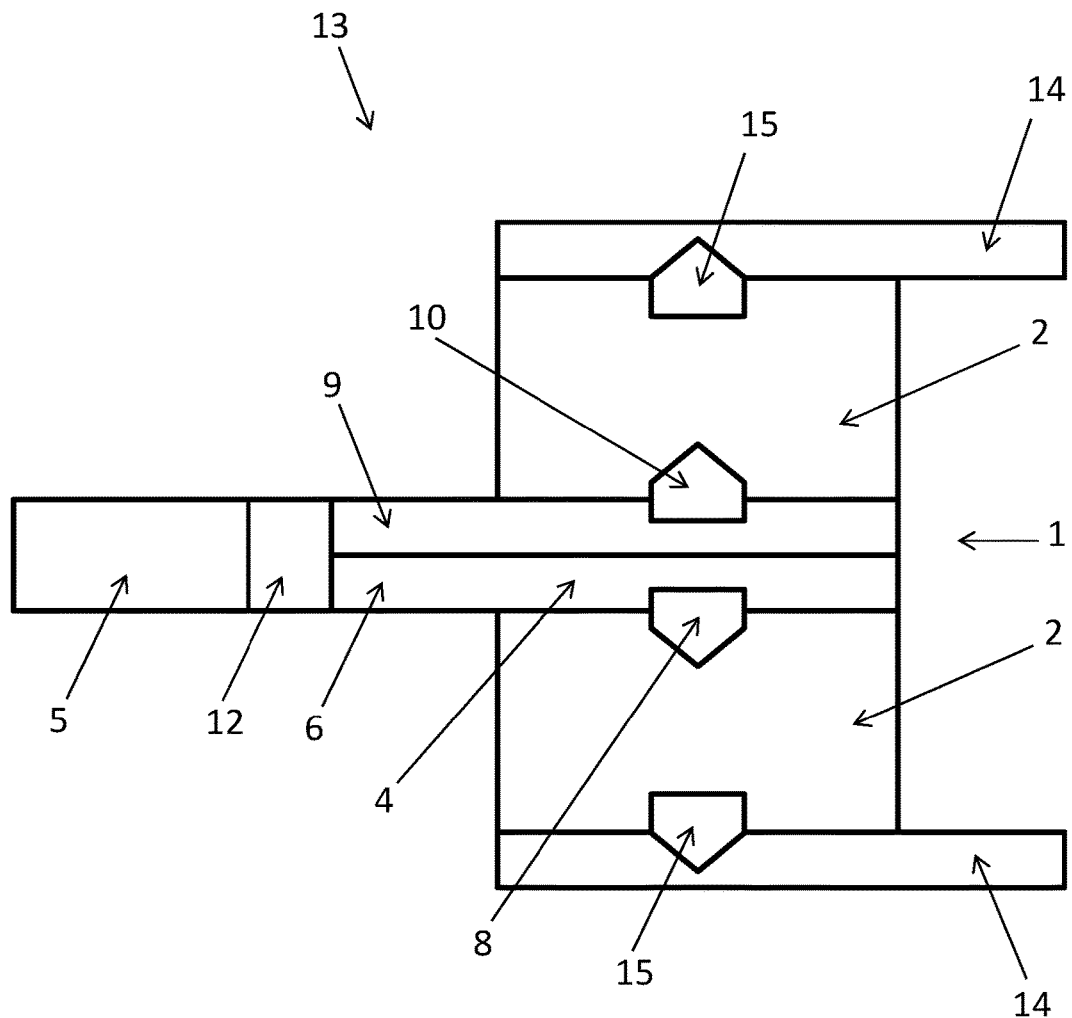
FIG. 2 shows in schematic form an alternative architecture with two accumulation surfaces.

It is therefore proposed, see FIG. 2, to stop the longitudinal movement of the products 3 in the conveying direction 7 to transfer them then to the accumulation surface 2 using a transfer means 8 that is immobile in the conveying direction 7. So as not to disturb the flow rate of products 3 coming from the upstream station, it is proposed to absorb elsewhere the entering products 3. The flow of entering products 3 is not disturbed, and the products 3, generally in contact with one another, remain in contact, or at least their separation does not increase at the time of a passage onto a belt at overspeed, before a new recompacting, which produces risks of falling first of all and impacts thereafter. It is understood, of course, that the products 3 diverted during the stoppage of those to be transferred are then, in their turn, stopped and then transferred transversely while the flow of products 3 is absorbed without change elsewhere, and so forth.

One of the advantages of the solution is that the flow of products 3 is not disturbed during the buffering phase during which the preceding products 3 are stopped: the products 3 continue to advance with the same spacing as the spacing that they have upon entering. Thus, accumulations based, as in the prior art, on an intermediate conveyor at overspeed relative to the entering flow of upstream products 3, serving as a buffer between this continuous upstream flow and an interrupted downstream conveying, where the products 3 are regularly stopped and then transferred, are avoided. This type of solution is not the best for rapid flow rates of fragile products, such as glass bottles, because the products 3 are spread apart from one another on the conveyor at overspeed, while undergoing dangerous accelerations, then settle violently against one another at the approach of the downstream conveyor, in stopping. In addition, the ground surface is relatively substantial, and adjusting the speeds is complex.

It is preferred here, while a batch of products 3 is stopped to be transferred, to accommodate the flow of products 3 without increasing the speed thereof, i.e., in particular to accommodate it on a conveyor traveling at the same speed and where the products 3 will therefore keep their spacing or at least will not be impacted violently during a slowing-down phase nor will be subjected to high accelerations.

Thus, the products 3 arrive in the pick-up zone 4 of the feeding device thanks to an input conveyor 5 that causes the products 3 to travel without changing their speed, and that therefore rotates preferably continuously. These products 3 are brought by the input conveyor 5 onto a receiving conveyor 6 that, itself, has a variable speed and can therefore be stopped for the purpose of the transverse transfer of the products 3 that it will have received. During this time of stoppage, and therefore of slowing down to a standstill, the products 3 are accommodated by a conveyor, a so-called buffer conveyor 9, which operates preferably in a manner that is equivalent to the receiving conveyor 6, in the sense that they each begin by accommodating the products 3 while letting them travel at the same speed as on the input conveyor 5 and then slow them down until stoppage, making possible their transverse transfer.

Several embodiments are possible and will now be described on the basis of the attached figures.

The accumulation device 13 of FIG. 2 has two accumulation surfaces 2, fed alternately by two conveyors that are side-by-side and that extend between them, said conveyors forming in turn respectively a receiving conveyor 6 and a buffer conveyor 9. The feeding device 1 therefore has an input conveyor 5, on which the products 3 are received from the upstream station. This input conveyor 5 can optionally extend to said station. The products 3 from the input conveyor 5 are in turn fed to one of the two conveyors positioned between the accumulation surfaces 2, and the feed device 1 for this purpose is provided with a diverter 12 that directs the flow of products 3 coming from the input conveyor 5 either to the one, or to the other, of the two central conveyors 6 or 9, downstream.

The two central conveyors, between the accumulation surfaces 2, forming in turn a receiving conveyor 6 and a buffer conveyor 9, are therefore controlled independently from one another and can thus have different speeds of travel over time. To begin, the input conveyor 5 will, for example, under the effect of the diverter 12, bring the products 3 to the conveyor at the bottom in the direction of the figure, which therefore forms the receiving conveyor 6. This receiving conveyor 6 then travels at the same speed as the input conveyor 5 so that the spacing of the products 3 is not changed when they go from the input conveyor 5 to the receiving conveyor 6. When the number of products 3 to be transferred transversely from the receiving conveyor 6 to the accumulation surface 2 has been diverted from the input conveyor 5 to said receiving conveyor 6, the operation of the diverter 12 is changed so that the products 3 are sent to the other central conveyor, therefore the uppermost of the two in the direction of the figure, this conveyor then forming a buffer conveyor 9.

This buffer conveyor 9, at the moment the products 3 are directed onto it, travels at the same speed as the input conveyor 5, which does not disturb the flow at all and maintains its compactness. While the flow of products 3 coming from the upstream station is directed to the buffer conveyor 9 and no longer to the receiving conveyor 6, the latter can slow down until stopping to bring to a standstill in the pick-up zone 4 the products 3 that it carries. The pick-up zone 4 is found essentially at the final end of the receiving conveyor 6. Once the products 3 are stopped by the stopping of the receiving conveyor 6, a transfer means 8 can be used to move the products 3 transversely onto the accumulation surface 2. A movement by horizontal sweeping, i.e., parallel to the conveying plane and to the accumulation surface 2, suffices.

During this entire transfer operation from the receiving conveyor 6, the products 3 continue to travel in compact flow from the output of the upstream station, onto the input conveyor 5 and then onto the buffer conveyor 9, at a uniform speed so that the flow is not disturbed and the products 3 do not undergo sudden variations of their speed or else impacts.

Once a pre-defined number of products 3 have arrived on the buffer conveyor 9, the diverter 12 will switch and again guide the products 3 to the receiving conveyor 6, whose speed will have beforehand been brought to that of the input conveyor 5, to avoid any change in the flow of products 3. It will be noted that the flow of products 3, in the area of the input conveyor 5, is never disturbed. The same maneuver takes place therefore as for the preceding cycle: the buffer conveyor 9, which no longer receives products 3, is slowed down to stopping, and then the products 3 that it contains are transferred transversely onto another accumulation surface 2, at the top of the figure.

The products 3 are therefore alternately sent to one of the conveyors, while the other is slowed down to stopping to transfer the products 3.

The buffer conveyor 9 therefore functions as an accumulation zone to receive the products 3 during the stoppage of the receiving conveyor 6 without disturbing the entering flow. These received products 3 can therefore, of course, also be sent to an accumulation surface 2, so that this buffer conveyor 9 can in its turn form a receiving conveyor 6 for the next cycle, the feeding of the receiving conveyor 6 for this second cycle and the feeding of the buffer conveyor 9 for the preceding cycle forming the same step. It is also understood that the buffer conveyor 9 brings the products 3 up to a pick-up zone 4 from where they are then cleared to be brought onto an accumulation surface 2.

Figure 3:
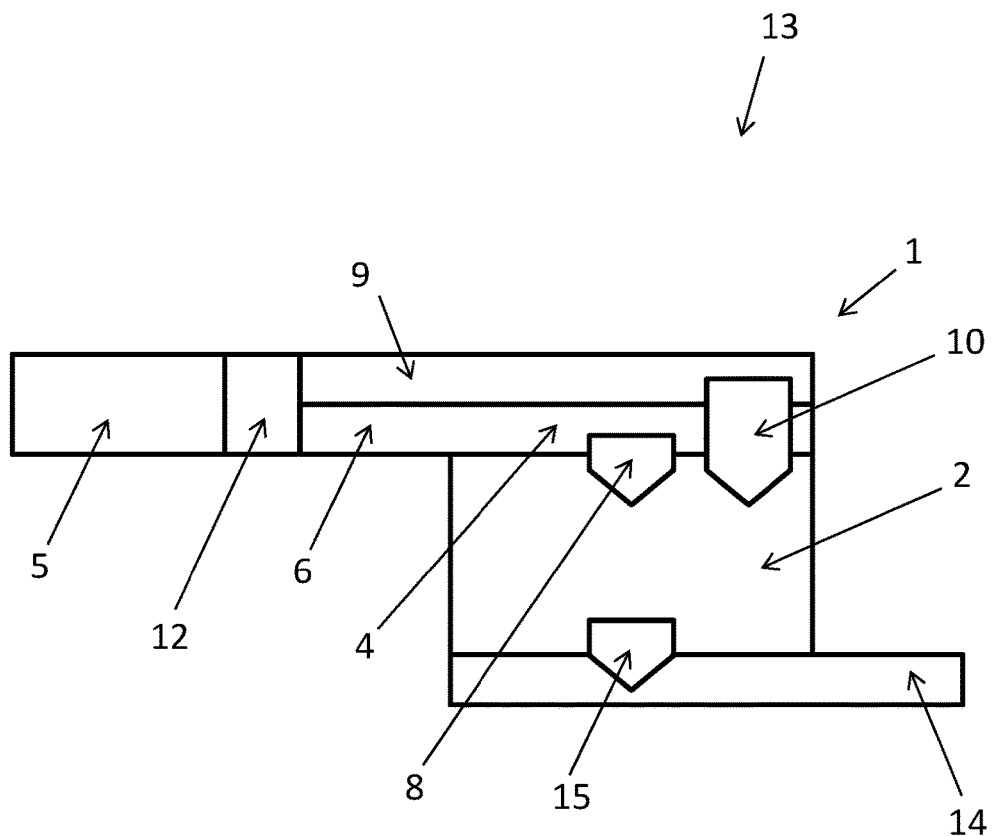
FIG. 3 shows in schematic form the transfer from two alternative conveyors.
Figure 4:
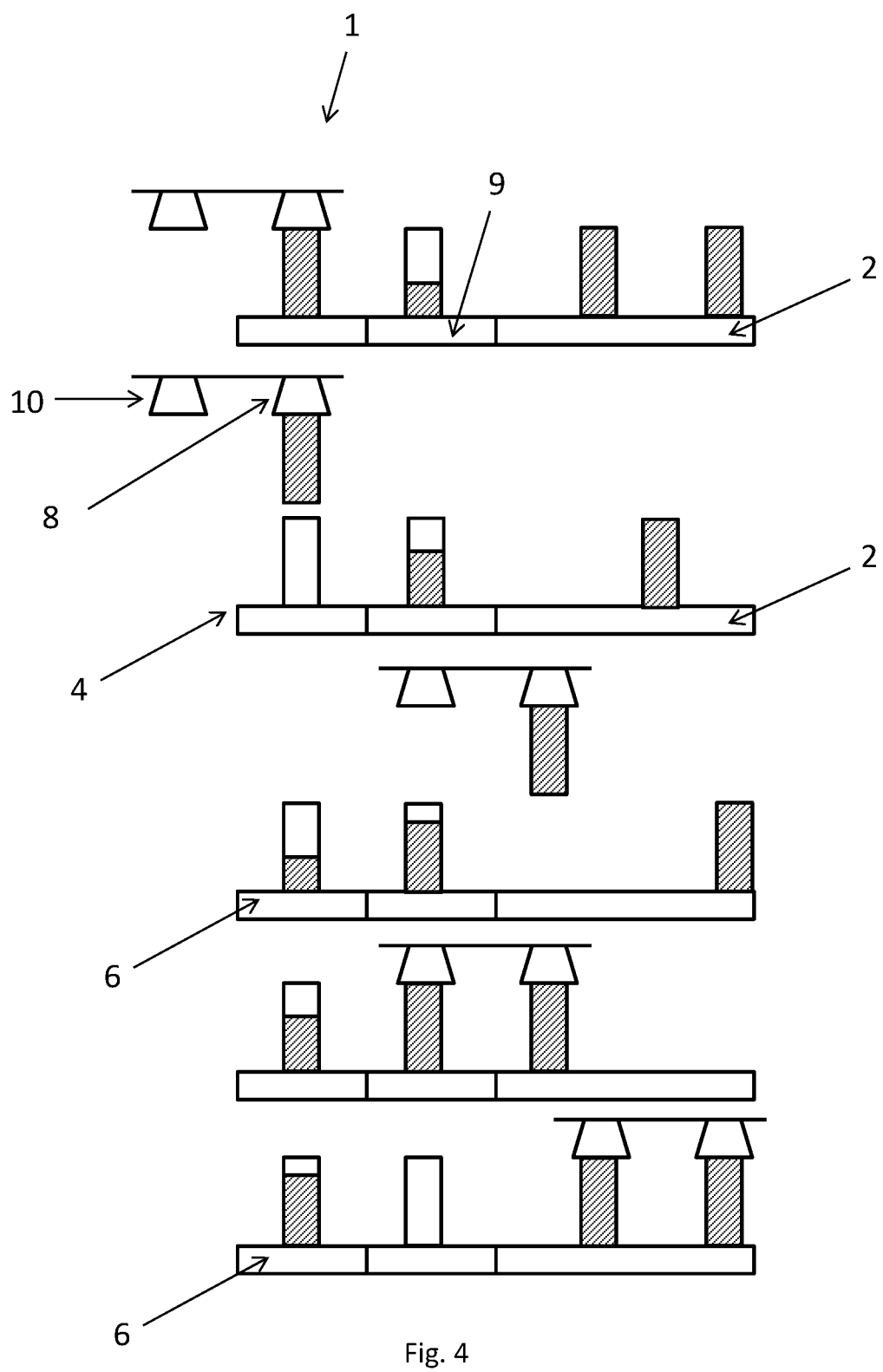
FIG. 4 shows in schematic form the possible operation of a tool for transfer toward the accumulation surface.

The embodiment illustrated in FIG. 3 is based on the same principle, but operates only with a single accumulation surface 2, so that the products 3 are sent that are received in advance at a constant speed either on one conveyor or on the other. The slowing-down until stopping of one of the conveyors, then the transfer of products that it contains, then its acceleration, therefore take place simultaneously upon the accommodation of the products 3 on the other conveyor. FIG. 4 shows in schematic form a possible transfer means 8, in the four essential steps of loading. It involves a manipulator that, in a first step, lifts up from the conveyor the products 3 that are leftmost once they have all arrived and stopped, to free up this conveyor and make it possible for it to receive other products 3, then, in a second step, shifts to the other conveyor, to the right, to collect the products 3 there that are then stopped, and then, finally, brings the two batches onto the accumulation surface 2, and so forth.

It will be noted that the products 3 of the conveyor on the left are therefore first cleared to free up this conveyor for the purpose of receiving products 3 by it, then brought onto the accumulation surface 2 at the same time as the products 3 that are received and stopped on the other conveyor, on the right. The clearing tool 10, which removes the products 3 from one of the conveyors, here that on the left of FIG. 4, is therefore maneuvered by the same actuator as the one that moves the transfer means 8.

The conveyor on the left can be considered as the receiving conveyor 6, the conveyor on the right then forming the buffer conveyor 9, or, conversely, the conveyor on the right can be considered as the receiving conveyor 6, the conveyor on the left then forming the buffer conveyor 9.

Figure 5:
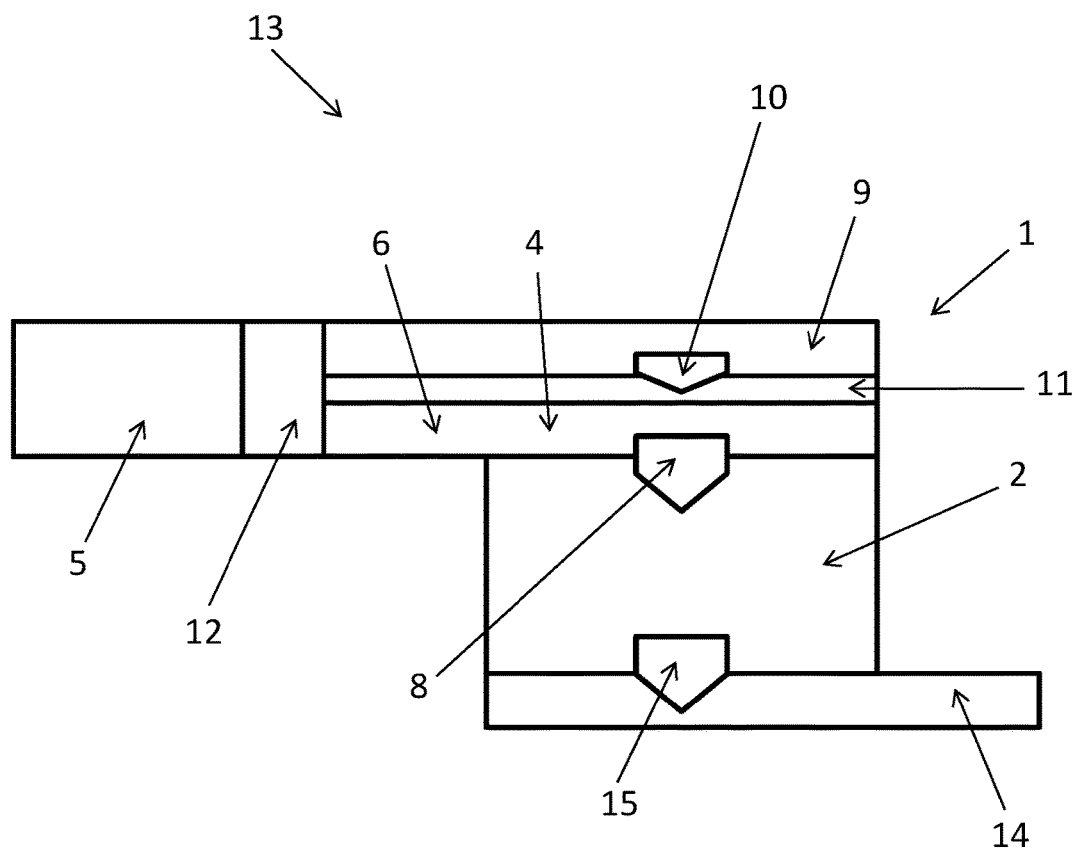
FIG. 5 is a top view of an architecture with two alternative conveyors separated by a dead plate.
Figure 6:
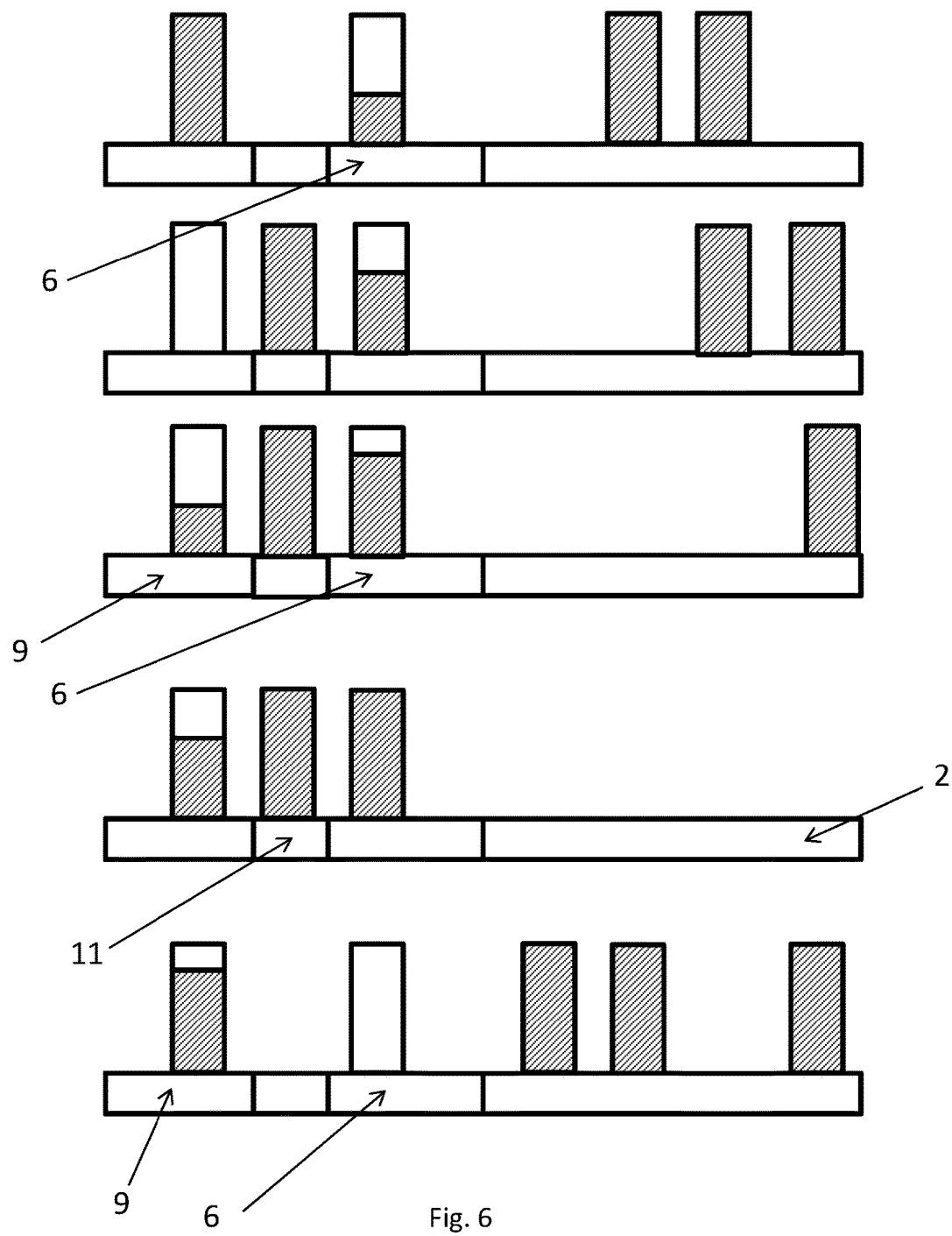
FIG. 6 shows in schematic form the transfer of the products with a central dead plate.

FIG. 5 illustrates, with respect to the sequential drawing of FIG. 6, an embodiment where the products 3 are cleared from the buffer conveyor 9 to a dead plate, and then are distributed, at the same time as the products 3 on the receiving conveyor 6, to be moved together onto the accumulation surface 2.

The receiving conveyor 6 is found therefore between the buffer conveyor 9 and the accumulation surface 2 on which both the batch of products 3 on the dead plate and the batch of products 3 on the receiving conveyor 6 are then brought simultaneously. The buffer conveyor 9 is therefore the topmost in FIG. 5 and the leftmost in FIG. 6. Here, the same principle is found of alternation between two conveyors, one of which is stopped while the other receives at the speed of the input, at least at the beginning.

Once all of the products 3 of a batch to be moved by the transfer means 8 have been received on the receiving conveyor 6, the products 3 entering from the input conveyor 5 are brought onto the buffer conveyor 9, so that the receiving conveyor 6 can be stopped and can make possible a transfer of the products 3 transversely to the accumulation surface 2.

Once the pre-defined number of products 3 has been sent to the buffer conveyor 9, the diverter 12 switches and then sends again the products 3 to the receiving conveyor 6. During this time, the buffer conveyor 9 is gradually stopped. The deceleration begins once all of the expected products 3 are received from the input conveyor 5, which does not slow down, thus avoiding jamming the flow. Generally, the deceleration should prevent the falling of objects 3 and therefore not be too sudden, yet without necessitating an excessive path length. Once the products 3 are stopped, they are cleared from the buffer conveyor 9 to a dead plate located between the buffer conveyor 9 and the receiving conveyor 6, in other words, transversely after the buffer conveyor 9 in the direction of the accumulation surface 2. A clearing tool 10 provided for this purpose thus shifts the products 3 transversely from the buffer conveyor 9 to the dead plate, so as to clear it quickly. As soon as the products 3 have been pushed onto the side, onto the dead plate, the buffer conveyor 9 can then be accelerated again to reach the travel speed of the flow of products 3 at the exit of the upstream station, which corresponds to the speed of the input conveyor 5 and which it is necessary to reach to avoid changing the flow of products 3.

The filling of the receiving conveyor 6 and the stopping, the clearing and the acceleration of the buffer conveyor 9 must be done in parallel. Thus, once the buffer conveyor 9 has reached the speed of the input conveyor 5 and once the receiving conveyor 6 has received all of the products 3 expected, the diverter 12 can again switch and send the products 3 from the input conveyor 5 no longer onto the receiving conveyor 6 but again onto the buffer conveyor 9. It is understood that at this stage, the feeding device 1 has accumulated two longitudinal rows of products 3 at the stoppage that extend one beside the other: one row on the dead plate, and, beside it, transversely to the conveying direction 7 to the accumulation surface 2, one row on the receiving conveyor 6. The transfer means 8 can therefore grasp and move two rows simultaneously up to the accumulation surface 2, by a movement comparable to a sweeping. It is understood that that leaves a greater time for the cycle of the transfer means 8.

The products 3 initially received on the buffer conveyor 9 are therefore brought to the accumulation surface 2 in two steps: a first where they are cleared by the clearing tool 10, transverse-pusher type, to the dead plate simply to free up the buffer conveyor 9, and a second where they are brought from the dead plate onto the accumulation surface 2. The products 3 received on the receiving conveyor 6 are themselves moved directly to the accumulation surface 2. The receiving conveyor 6 is found between the dead plate and the accumulation surface 2.

Figure 7:
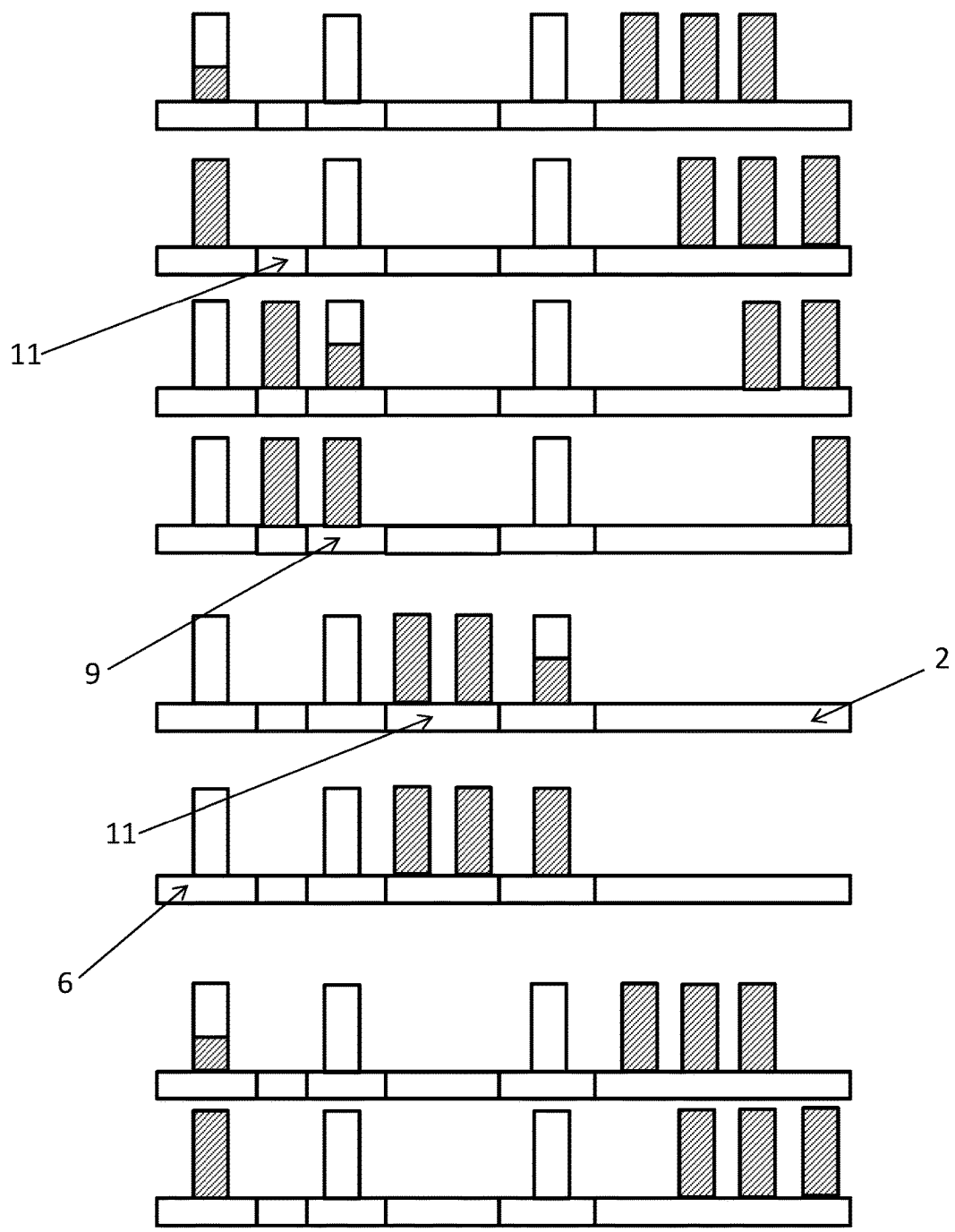
FIG. 7 corresponds to FIG. 6, with two dead plates.

By extension of this principle, FIG. 7 shows in schematic form a possible arrangement based on three conveyors separated by two dead plates. The leftmost dead plate receives the products 3 once the leftmost conveyor is stopped and the flow of products 3 arrives directly onto the central conveyor, then the products 3 of the dead plate on the left as well as the products 3 of the stopped central conveyor are cleared to the dead plate on the right, while the flow of products 3 arrives on the rightmost conveyor, then three rows of products 3 are cleared simultaneously once the conveyor on the right has stopped. The flow of entering products 3 is therefore in turn fed to each of the three conveyors. It is also understood that each of the conveyors receiving products 3 brings them up to a pick-up zone 4 from where they are cleared, either to go directly onto the accumulation surface 2, or to be temporarily placed on standby before arriving on said surface.

Figure 8:
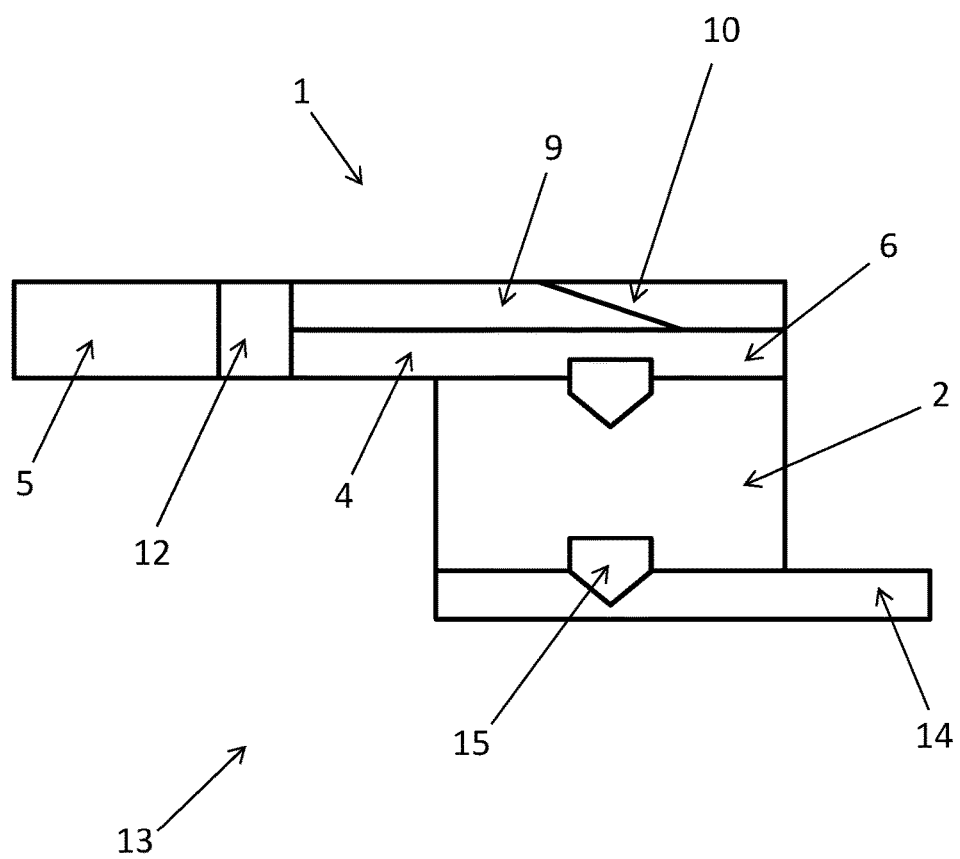
FIG. 8 is a design concept with a deflector bringing the products from one conveyor to the other.
Figure 9:
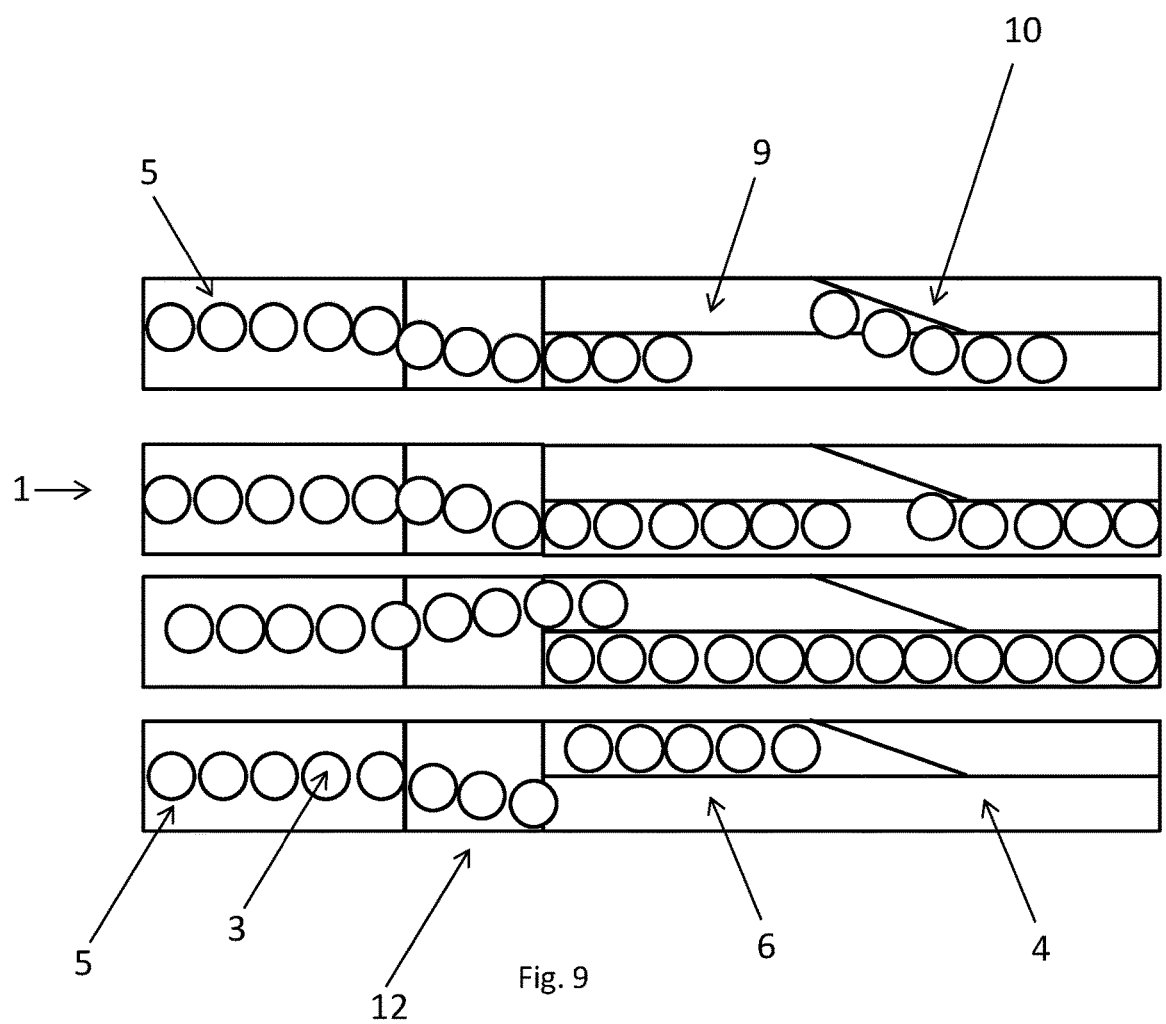
FIG. 9 shows the position of the products in a design concept according to FIG. 8.

FIG. 8 illustrates another embodiment, in that the receiving conveyor 6 and the buffer conveyor 9 are mounted side by side. The receiving conveyor 6 functions in an alternate manner, i.e., it is from time to time regularly stopped to make it possible for the transfer means 8 to move the products 3 placed on it. In this embodiment, the clearing tool 10, which makes it possible to remove the products 3 from the buffer conveyor 9, takes the form of a simple deflector, optionally mobile, which folds down the products 3 onto the receiving conveyor 6, as FIG. 9 shows. The buffer conveyor 9 can, itself, be operated continuously, optionally at the same speed as the input conveyor 5. The input conveyor 5 first of all delivers the products 3 to the receiving conveyor 6, which then travels at most at the speed of the input conveyor 5, so as not to change the flow of products 3 and thus to avoid impacts, accelerations, decelerations that are uncontrolled, etc. After a predetermined quantity of products 3 have been delivered to the receiving conveyor 6, the diverter 12 switches its operation and directs the products 3 to a buffer conveyor 9. Here again, once the flow of products 3 is diverted from the receiving conveyor 6, the latter can be gradually slowed down and then stopped. The products 3 then traveling on the buffer conveyor 9 are directed toward its end, and, during their advance, pushed toward the receiving conveyor 6 by a deflector forming a clearing tool 10. The receiving conveyor 6, when it slows down, must therefore do it with, on the one hand, products 3 on it coming from the input conveyor 5 directly, and, on the other hand, products 3 brought on it by the clearing tool 10.

The receiving conveyor 6 therefore has a group of products 3 coming, in part, directly from the input conveyor 5, and, for the rest, downstream in the direction of the conveying direction 7, directly from the buffer conveyor 9. At the end of its slowing-down, when it is stopped, the receiving conveyor 6 therefore has the number of products 3 expected for the transfer from the pick-up zone 4 at its end to the accumulation surface 2. When the stopped products 3 are moved by the tool 8 from the receiving conveyor 6 to the accumulation surface 2, the products 3 arriving in the area of the input conveyor 5 are sent to the buffer conveyor 9.

Figure 10:
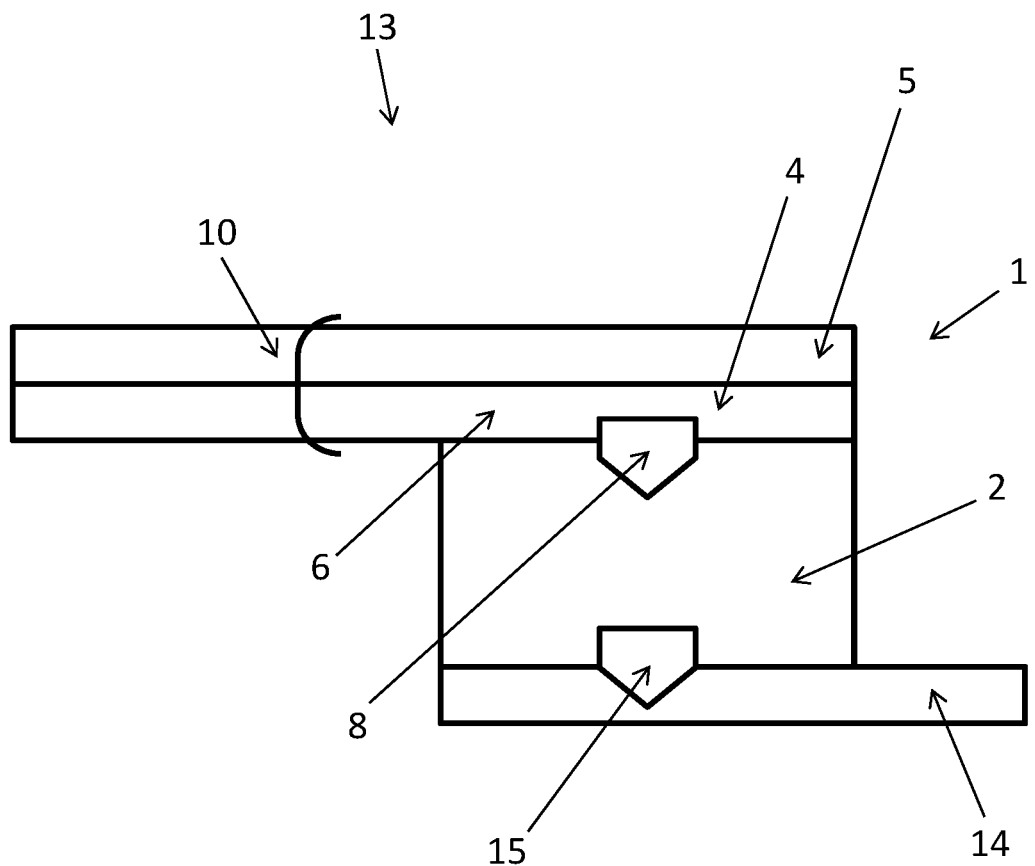
FIG. 10 represents a feeding with two conveyors traveling in opposite directions, connected by a mobile transfer vane.
Figure 11:
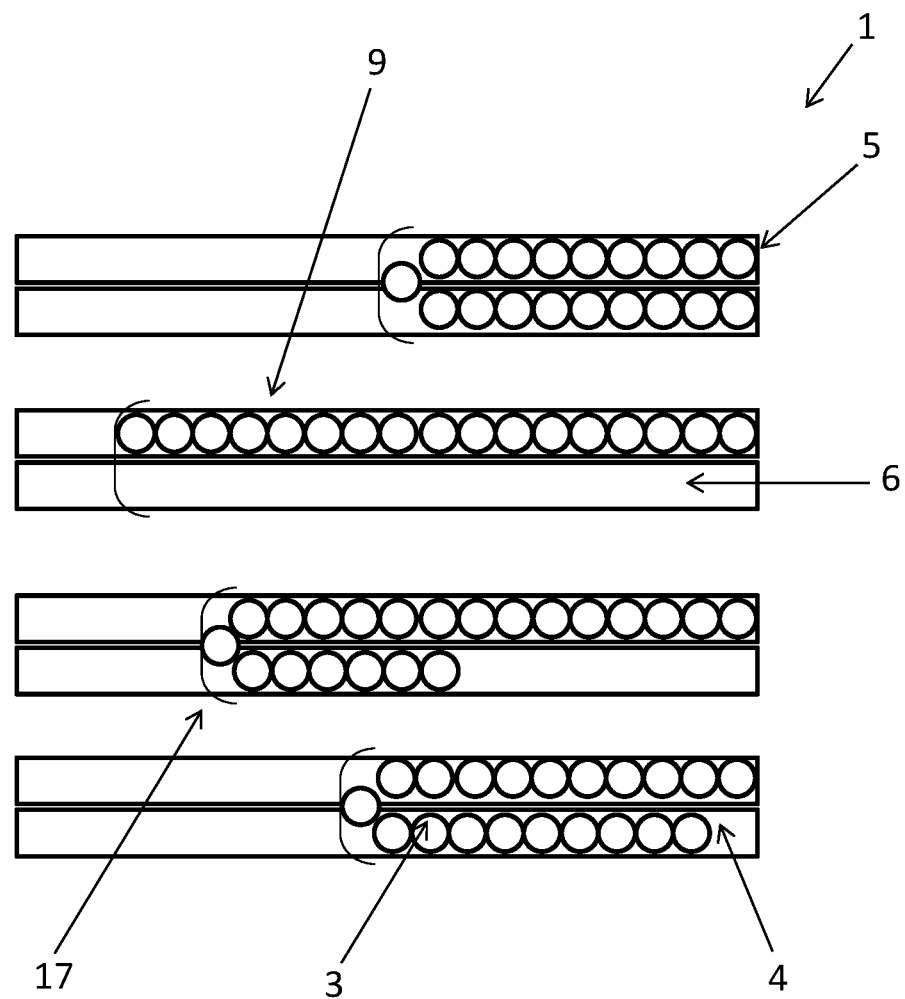
FIG. 11 represents the change in position of the products for a feeding that corresponds to FIG. 10.
Figure 12:
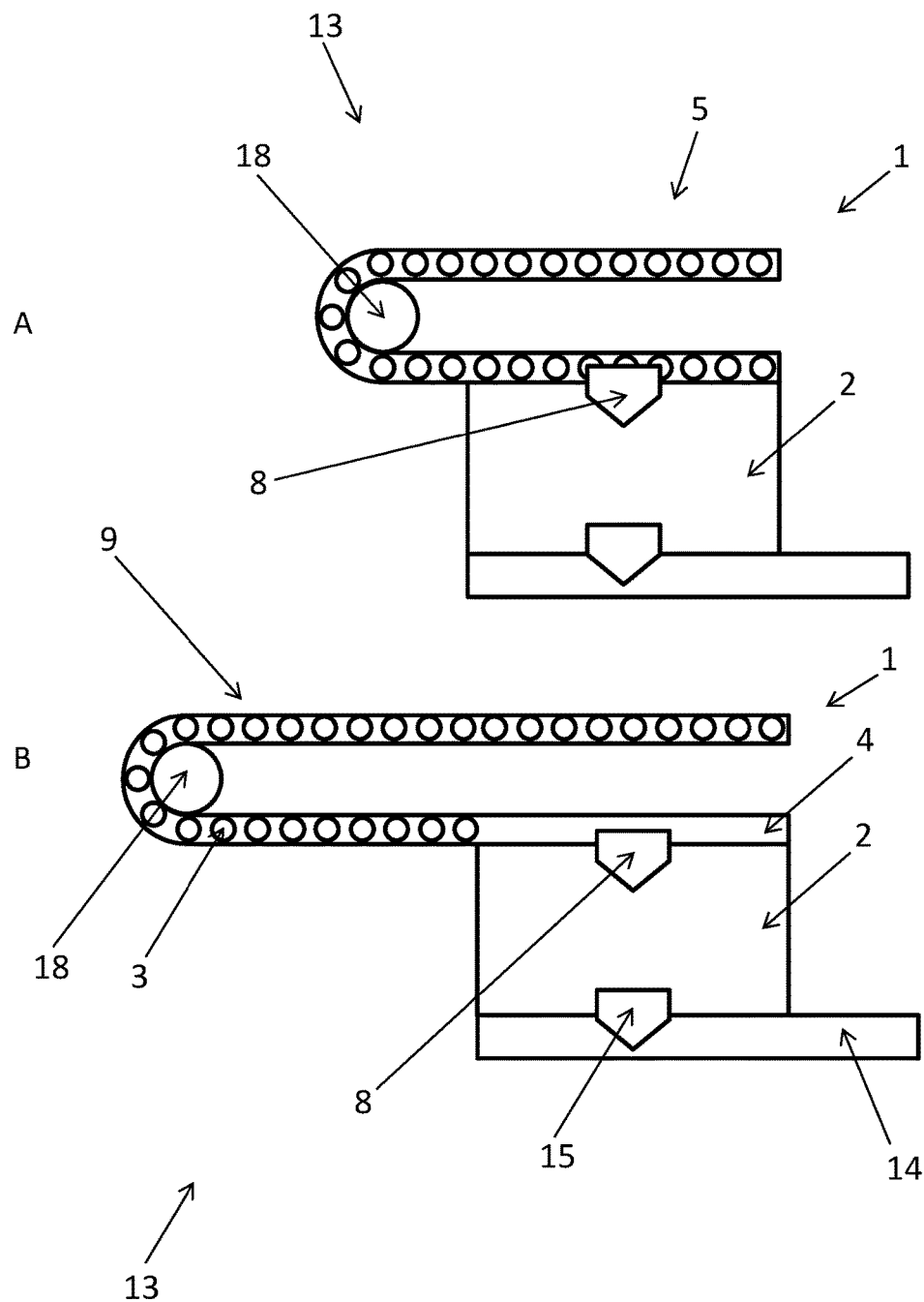
FIG. 12 shows in schematic form a design concept with an input conveyor with variable dimension.

FIGS. 10 to 12 relate to embodiments where the useful length of the conveying is changed between the input conveyor 5 and the receiving conveyor 6, so as to form a buffer conveyor 9.

In the embodiment of FIGS. 10 and 11, the input conveyor 5 travels continuously, at the pace of the input flow, to maintain the spacing between the products 3. The feeding device 1 is provided with a moving blade 17, which ensures the passage of the products 3 from the input conveyor 5 to the receiving conveyor 6. The input conveyor 5 can operate continuously, while the receiving conveyor 6 operates discontinuously, and therefore is stopped periodically from time to time so that the products 3 can be safely cleared therefrom transversely by the transfer means 8. During the slowing-down phase until stopping of the receiving conveyor 6 for the transfer of the products 3 onto the accumulation surface 2, the blade 17 moves and moves away longitudinally. In so doing, the products 3 delivered by the input conveyor 5 are thus then received, on standby, on a portion forming buffer conveyor 9, being found in the extension of said input conveyor 5. The number of products 3 in the buffer conveyor 9 therefore varies over time, between a minimum value and a maximum value.

The capacity of the buffer conveyor 9 is maximum when the blade 17 is found moved away to the maximum. The reverse movement of the blade 17, forming a clearing tool 10, has the effect of reducing to its minimum the capacity of the buffer conveyor 9 by clearing at least one part, even the entirety, of the products 3 that are found there and by bringing them onto the receiving conveyor 6 then to be taken by the transfer means 8.

FIG. 12 illustrates another embodiment, in two different states. The input conveyor 5, the buffer conveyor 9 that follows it, and the receiving conveyor 6 here are made of a single conveyor belt, of which the figure shows the upper half. The upper part of this one-piece conveyor belt extends in a U shape toward the left, the lower part, not shown, extending in a U shape of complementary length. The upper part and the lower part are connected by half-turn returns around an axis that extends from top to bottom in the figure. Thus, when the half-turn wheel of the upper part moves farther away, such as when going from FIG. 12A to FIG. 12B, the half-turn wheel of the lower part comes closer. The conveyor belt therefore has a constant total length, but only one useful portion in the area of the upper part.

The upper segment of the U is therefore permanently moving and therefore forms the input conveyor 5. The lower segment, forming a receiving conveyor 6, can also be in motion, so as to bring into a pick-up zone 4 all of the products 3 required for the transfer. When the predetermined number of products 3 is reached in the pick-up zone 4, the receiving conveyor 6 must be stopped. To make it possible for the flow of products 3 to continue to be received in the accumulation device 13, the half-turn wheel is moved farther away, the upper run thus being able to continue to advance continuously.

The products 3 that were found on the input conveyor 5 therefore continue to travel onto a buffer conveyor 9 waiting to be able in their turn to arrive on the receiving conveyor 6. The buffer conveyor 9 is thus obtained by moving away the return wheel, and by then inserting between the input conveyor 5 and the receiving conveyor 6 a conveyor belt portion that accommodates the products 3 and therefore forms the buffer conveyor 9. This buffer conveyor 9 accommodates the products 3 at the same speed as the input conveyor 5, with which it is integral since it is formed from the same run. The compactness of the flow therefore is not changed.

After the products 3 in the pick-up zone 4 have been transferred onto the accumulation surface 2, the receiving conveyor 6 can be placed in motion again, and to do that, the return wheel is rendered immobile, indeed is brought closer to its starting position. It is understood that the speed of the receiving conveyor 6 thus depends on the speed of travel of the return wheel 18 as well as on the speed of the input conveyor 5. The fact of moving the return wheel 18 closer therefore imposes on it a movement from left to right in FIG. 12, transfers the products 3 from the upstream conveyor 9 to the receiving conveyor 6, and therefore forms a clearing tool 10.

Thanks to the invention, it is thus possible to provide a principle of feeding of a receiving surface, accumulation-surface type, which avoids impacts between the bottles and whose operation can thus be fully adjusted to that of the upstream station.

Although the description above is based on particular embodiments, it in no way limits the scope of the invention, and modifications can be made, particularly by substitution of technical equivalents or by a different combination of all or part of the characteristics developed above.

What is claimed is:

1. A device for feeding (1) at least one receiving surface between two consecutive stations in a production line for handling products (3) on an assembly line, having a pick-up zone (4) from where the products (3) are transferred to said surface, and comprising an input conveyor (5) to receive and maintain a compact flow of products (3) received from an upstream station, a receiving conveyor (6), extending along a conveying direction (7) in the pick-up zone (4) to receive and then stop the flow of products (3) there delivered by the input conveyor (5), as well as a transfer manipulator (8), to move, transversely to the conveying direction (7), toward the receiving surface, the products (3) stopped in the pick-up zone (4), wherein the device further comprises at least one buffer conveyor, able to receive the compact flow of products (3) from the input conveyor (5) when the products (3) are stopped on the receiving conveyor (6) for their transfer, and, maintain the compactness of said flow.

2. The feeding device (1) according to claim 1, further comprising a clearing tool (10) to clear the products (3) from the at least one buffer conveyor with the objective of a future reception of products (3).

3. The feeding device (1) according to claim 2, where the clearing tool (10) moves the products (3) from the at least one stopped buffer conveyor directly onto a receiving surface other than the one onto which the transfer manipulator (8) brings the products (3) from the receiving conveyor (6).

4. The feeding device (1) according to claim 2, where the clearing tool (10) moves the products (3) from the at least one stopped buffer conveyor directly onto the same receiving surface as the one onto which the transfer manipulator (8) brings the products (3) from the receiving conveyor (6).

5. The feeding device (1) according to claim 2, where the clearing tool (10) moves the products (3) from the at least one stopped buffer conveyor directly onto a wait zone (11), from where the transfer manipulator (8) then grasps them to move them directly onto the receiving surface, at the same time as the products (3) from the receiving conveyor (6).

6. The feeding device (1) according to claim 2, where the clearing tool (10) moves the products (3) from the at least one buffer conveyor to the receiving conveyor (6), for a subsequent transfer to the receiving surface.

7. The feeding device (1) according to claim 2, further comprising a diverter (12) to direct the compact flow of products (3) from the input conveyor (5) either to the receiving conveyor (6) or to the at least one buffer conveyor.

8. The feeding device (1) according to claim 2, wherein the buffer conveyor and the receiving conveyor (6) are in sequence, the buffer conveyor coming between the input conveyor (5) and the receiving conveyor (6).

9. The feeding device (1) according to claim 1, further comprising a diverter (12) to direct the compact flow of products (3) from the input conveyor (5) either to the receiving conveyor (6) or to the at least one buffer conveyor.

10. The feeding device (1) according to claim 1, wherein the buffer conveyor and the receiving conveyor (6) are in sequence, the buffer conveyor coming between the input conveyor (5) and the receiving conveyor (6).

11. A preparation device, to be mounted between two stations in a production line for handling products (3) on an assembly line, comprising at least one rectangular-shaped receiving surface on which products (3) can be accumulated, wherein the preparation device further comprises a feeding device (1) according to claim 1, positioned so that the receiving conveyor (6) extends along an edge of said at least one receiving surface.

12. The preparation device according to claim 11, further comprising at least one output conveyor (14), extending along the edge of the at least one receiving surface that is opposite the one where the receiving conveyor (6) extends, and an output tool (15) to move the products (3) from the receiving surface to said output conveyor (14).

13. A method for feeding a receiving surface installed between two stations in a production line for handling products (3) on an assembly line, comprising:
   receiving continuously a compact flow of products (3) from an upstream station in the area of an input conveyor (5), in particular a flow where the products (3) are in contact one behind the other in a single line,
   feeding, using said input conveyor (5), a receiving conveyor (6) on which the flow maintains its compactness,
   braking until stopping the products (3) on the receiving conveyor (6), then freeing up the receiving conveyor (6) by removing the products (3) from it that are found there to accumulate them later on a receiving surface, and make it possible for the receiving conveyor (6) to receive new products (3), the method comprising
   a step, used during the braking and the freeing-up of the products (3) of the receiving conveyor (6), consisting essentially in feeding the compact flow of products (3) from the input conveyor (5) to a buffer conveyor while maintaining the compactness of it, as well as
   a subsequent step during which the products (3) that are found on the buffer conveyor are cleared from it, to accumulate them later on the or a receiving surface, and make it possible for the buffer conveyor to receive new products (3).

14. The method according to claim 13, further comprising a step consisting essentially in changing the direction of the compact flow of the input conveyor (5) toward the receiving conveyor (6) or toward the or a buffer conveyor.

15. The method according to claim 14, where the compact flow of products (3) from the input conveyor (5) is accommodated continuously and cyclically by the sequence of numerous conveyors comprising a receiving conveyor (6) and at least one buffer conveyor, the braking and the stoppage of the products (3) for the purpose of their clearing for accumulation and freeing-up of a conveyor being accompanied by the accommodation of the compact flow by the next conveyor.

16. The method according to claim 13, comprising during the feeding of the receiving conveyor (6) using the input conveyor (5), braking until stoppage of the products (3) on the buffer conveyor, and freeing up the buffer conveyor by clearing the products (3) from it by transferring them to a wait zone (11) of the dead-plate type, and, during the subsequent feeding of the buffer conveyor, transferring simultaneously onto the receiving surface both the products (3) in a wait zone (11) and the products (3) stopped on the receiving conveyor (6) between the two.

17. The method according to claim 16, where the compact flow of products (3) from the input conveyor (5) is accommodated continuously and cyclically by the sequence of numerous conveyors comprising a receiving conveyor (6) and at least one buffer conveyor, the braking and the stoppage of the products (3) for the purpose of their clearing for accumulation and freeing-up of a conveyor being accompanied by the accommodation of the compact flow by the next conveyor.

18. The method according to claim 13, further comprising a step consisting essentially in increasing the conveying length between the input conveyor (5) and the receiving conveyor (6) so as to create between them a buffer conveyor receiving the flow while preserving the compactness of it.

19. The method according to claim 18, where the compact flow of products (3) from the input conveyor (5) is accommodated continuously and cyclically by the sequence of numerous conveyors comprising a receiving conveyor (6) and at least one buffer conveyor, the braking and the stoppage of the products (3) for the purpose of their clearing for accumulation and freeing-up of a conveyor being accompanied by the accommodation of the compact flow by the next conveyor.

20. The method according to claim 13, where the compact flow of products (3) from the input conveyor (5) is accommodated continuously and cyclically by the sequence of numerous conveyors comprising a receiving conveyor (6) and at least one buffer conveyor, the braking and the stoppage of the products (3) for the purpose of their clearing for accumulation and freeing-up of a conveyor being accompanied by the accommodation of the compact flow by the next conveyor.

* * * * *